US010033310B2

(12) United States Patent
Gyoten

(10) Patent No.: US 10,033,310 B2
(45) Date of Patent: Jul. 24, 2018

(54) DRIVE CONTROL DEVICE FOR MOTOR

(71) Applicant: Panasonic Intellectual Property Management Co., Ltd., Osaka (JP)

(72) Inventor: Takaaki Gyoten, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/623,670

(22) Filed: Jun. 15, 2017

(65) Prior Publication Data

US 2017/0366118 A1 Dec. 21, 2017

(30) Foreign Application Priority Data

Jun. 20, 2016 (JP) ................................. 2016-121876

(51) Int. Cl.
*H02P 6/24* (2006.01)
*H02P 6/15* (2016.01)
(Continued)

(52) U.S. Cl.
CPC .............. *H02P 6/157* (2016.02); *H02M 1/08* (2013.01); *H02M 7/537* (2013.01); *H02P 2203/09* (2013.01)

(58) Field of Classification Search
None
See application file for complete search history.

(56) References Cited

U.S. PATENT DOCUMENTS

| 4,514,677 A | * | 4/1985 | Kaufman, III | ............ H02P 3/18 |
| | | | | 318/759 |
| 5,939,850 A | * | 8/1999 | Kondoh | ............... H02H 7/0833 |
| | | | | 318/400.04 |

(Continued)

FOREIGN PATENT DOCUMENTS

| JP | 07-163786 | 6/1995 |
| JP | 2000-57714 | 2/2000 |

(Continued)

*Primary Examiner* — Bentsu Ro
(74) *Attorney, Agent, or Firm* — Wenderoth, Lind & Ponack, L.L.P.

(57) ABSTRACT

A drive control device for a motor includes an input terminal, an output terminal, an inverter circuit, a first switch unit, a capacitor, a diode, a rectifier circuit, a photo coupler, a second switch unit, and a voltage detector. The inverter circuit converts a direct current voltage into an alternating current voltage, and outputs the alternating current voltage to the output terminal. The first switch unit shorts the output terminal based on a control signal. The capacitor is connected to the input terminal, and is charged by a direct current voltage. The diode is connected between the input terminal and the capacitor. The diode limits a direction where a charge current for charging the capacitor flows. The rectifier circuit rectifies an induced voltage, which is generated in the motor, and outputs a rectified voltage. The photo coupler converts the rectified voltage into an optical signal, and thereafter, converts the optical signal into a converted signal. The second switch unit outputs the control signal based on the converted signal. The voltage detector detects whether the direct current voltage is input to the input terminal, and determines whether to negate the control signal.

7 Claims, 3 Drawing Sheets

(51) Int. Cl.
*H02M 7/537* (2006.01)
*H02M 1/08* (2006.01)

(56) References Cited

U.S. PATENT DOCUMENTS

| | | | |
|---|---|---|---|
| 6,396,652 | B1 | 5/2002 | Kawachi et al. |
| 7,372,227 | B2 * | 5/2008 | Rainer ...................... H02P 3/22 |
| | | | 318/375 |
| 8,736,208 | B2 * | 5/2014 | Okumura ............. B62D 5/0487 |
| | | | 318/362 |

FOREIGN PATENT DOCUMENTS

| JP | 2002-374689 | 12/2002 |
|---|---|---|
| JP | 2009-295791 | 12/2009 |

* cited by examiner

DRIVE CONTROL DEVICE FOR MOTOR

BACKGROUND

1. Technical Field

The present disclosure relates to a drive control device for a motor, which controls drive of a motor.

2. Description of Related Art

Unexamined Japanese Patent Publication No. 2002-374689 discloses a drive device that drives a motor. This drive device includes an inverter circuit and an inverter controller. The inverter circuit converts a direct current voltage into an alternating current voltage, and supplies the alternating current voltage to the motor. The inverter controller controls switching elements of the inverter circuit to turn ON and OFF. At a time when direct current braking for the motor is performed, while controlling a negative electrode-side switching element of one phase of the inverter circuit so that a continuous ON operation is performed, the inverter controller controls positive electrode-side switching elements of other phases of the inverter circuit so that a pulse width modulation (PWM) operation is performed. In this way, the drive device quickly stops the motor with appropriate braking power.

SUMMARY

A drive control device for a motor according to the present disclosure serves to control the drive of the motor.

A drive control device for a motor includes an input terminal, an output terminal, an inverter circuit, a first switch unit, a capacitor, a diode, a rectifier circuit, a photo coupler, a second switch unit, and a voltage detector. The input terminal is a terminal that receives a direct current voltage. The output terminal is a terminal that outputs an alternating current voltage to the motor. The inverter circuit converts a direct current voltage into an alternating current voltage, and outputs the alternating current voltage to the output terminal. The first switch unit shorts the output terminal based on a control signal. The capacitor is connected to the input terminal, and is charged by a direct current voltage. The diode is connected between the input terminal and the capacitor. The diode limits a direction where a charge current for charging the capacitor flows. The rectifier circuit rectifies an induced voltage, which is generated in the motor, and outputs a rectified voltage. The photo coupler converts the rectified voltage into an optical signal, and thereafter, converts the optical signal into a converted signal. The second switch unit includes a second switch unit input terminal connected to the capacitor, and a second switch unit output terminal that outputs the control signal. The second switch unit outputs the control signal based on the converted signal. The voltage detector detects whether the direct current voltage is input to the input terminal, and determines whether to negate the control signal. When not receiving the converted signal, the second switch unit outputs a voltage of the second switch unit input terminal as the control signal to the second switch unit output terminal. When receiving the converted signal, the second switch unit outputs the control signal to the second switch unit output terminal. When detecting that the direct current voltage is input to the input terminal, the voltage detector negates the control signal.

The drive control device for a motor according to the present disclosure can quickly stop the motor while suppressing overcurrents generated in coils of the motor.

DETAILED DESCRIPTION

Exemplary embodiments will be described below in detail with reference to the drawings appropriately. However, detailed descriptions more than necessary might be sometimes omitted. For example, there is a case where a detailed description of already well-known items or a repeated description of substantially the same configurations is omitted. These omissions are made to avoid unnecessary redundancy of the following description, and to facilitate the understanding of those skilled in the art.

Note that the inventor of the present disclosure provides the accompanying drawings and the following description in order to allow those skilled in the art to fully understand the present disclosure, and does not intend to limit the subject matter as described in the appended claims.

First Exemplary Embodiment

In a system that controls rotation of a motor, it is preferable that such control of the rotation can be continued until the motor stops even when supply of power is stopped unexpectedly.

It is conceivable to use a backup power supply such as a storage battery in order to brake the motor in a state in which supply of a direct current voltage from a voltage source of the system to a drive device for the motor is stopped. The backup power supply can supply power for operating the drive device such as an inverter controller. However, by the fact that the backup power supply is provided, the system will be complex and expensive.

Moreover, in the system that controls the rotation of the motor, it is preferable that the motor can be stopped quickly when the supply of the power is stopped unexpectedly.

A coil of the motor is shorted in a state in which the supply of the direct current voltage to the drive device for the motor is stopped, and thus the motor can be stopped quickly. However, if the coil of the motor is shorted immediately after the supply of the power is stopped unexpectedly, an excessive current might flow into the coil of the motor or a circuit of the drive device. This situation might cause burnout of the coil or damage of the circuit of the drive device.

A first exemplary embodiment will be described below with reference to FIGS. 1 to 3.

[1-1. Configuration]

Figure 1:
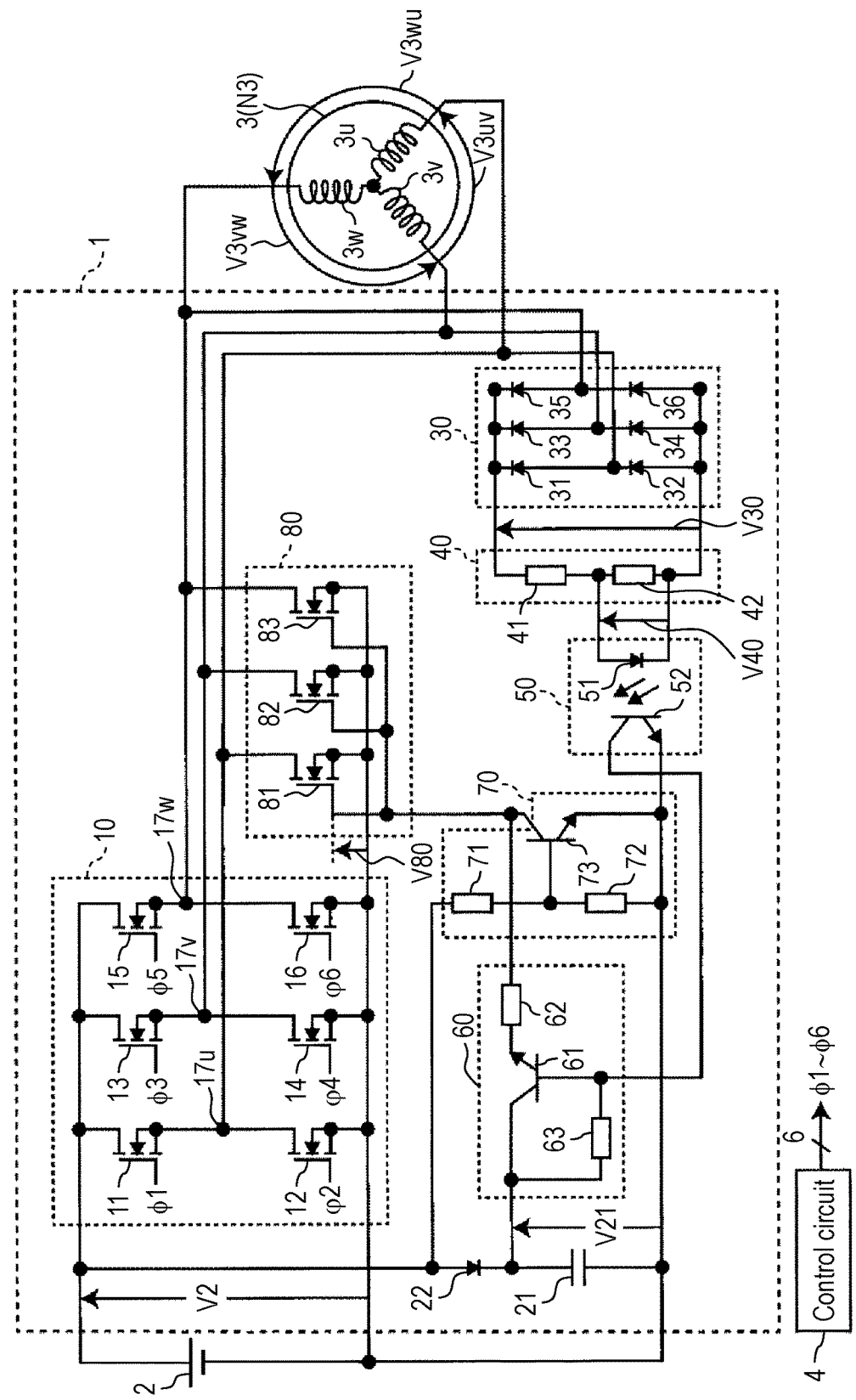
FIG. 1 is a circuit diagram illustrating a configuration example of drive control device 1 for motor 3 in a first exemplary embodiment.

FIG. 1 is a circuit diagram illustrating a configuration example of drive control device 1 for motor 3 according to the first exemplary embodiment. Drive control device 1 includes inverter circuit 10, capacitor 21, diode 22, rectifier circuit 30, voltage divider 40, photo coupler 50, switch circuit 60, voltage detector circuit 70, and short-circuit switch array 80. Based on control signals φ1 to φ6 from control circuit 4, inverter circuit 10 converts direct current voltage V2, which is supplied from voltage source 2, into a three-phase alternating current voltage, and outputs the three-phase alternating current voltage. Drive control device 1 controls drive of motor 3 by supplying the three-phase alternating current voltage, which is output from inverter circuit 10, individually to coils 3u, 3v and 3w of three phases of motor 3.

In FIG. 1, inverter circuit 10 is formed of a full bridge circuit including six transistors 11 to 16. For example, transistors 11 to 16 are N-channel field effect transistors (hereinafter, referred to as N-channel FETs). Transistors 11, 12 are connected in series to each other in this order between a positive terminal and a negative terminal of voltage source 2. In a similar way, transistors 13, 14 are connected in series to each other in this order between the positive terminal and the negative terminal of voltage source 2. In a similar way, transistors 15, 16 are connected in series to each other in this order between the positive terminal and the negative terminal of voltage source 2.

A more specific configuration of inverter circuit 10 will be described. A drain of transistor 11 is connected to the positive terminal of voltage source 2. A source of transistor 11 is connected to a drain of transistor 12. A source of transistor 12 is connected to the negative terminal of voltage source 2. In a similar way, a drain of transistor 13 is connected to the positive terminal of voltage source 2. A source of transistor 13 is connected to a drain of transistor 14. A source of transistor 14 is connected to the negative terminal of voltage source 2. In a similar way, a drain of transistor 15 is connected to the positive terminal of voltage source 2. A source of transistor 15 is connected to a drain of transistor 16. A source of transistor 16 is connected to the negative terminal of voltage source 2. Note that a flywheel diode may be connected between the drain and source of each of transistors 11 to 16.

U-phase positive output terminal 17u, which is a connecting node between the source of transistor 11 and the drain of transistor 12, is connected to U-phase coil 3u of motor 3. V-phase positive output terminal 17v, which is a connecting node between the source of transistor 13 and the drain of transistor 14, is connected to V-phase coil 3v of motor 3. W-phase positive output terminal 17w, which is a connecting node between the source of transistor 15 and the drain of transistor 16, is connected to W-phase coil 3w of motor 3. Control signals φ1 to φ6 from control circuit 4, which controls number of revolutions N3 of motor 3, are input to gates of transistors 11 to 16, respectively. For example, control signals φ1 to φ6 are pulse width modulation (PWM) signals. Inverter circuit 10 performs switching control for transistors 11 to 16 based on control signals φ1 to φ6, thereby converts direct current voltage V2 into the three-phase alternating current voltage, and outputs the three-phase alternating current voltage to motor 3.

One terminal of capacitor 21 is connected to the positive terminal of voltage source 2 via diode 22. The other terminal of capacitor 21 is connected to the negative terminal of voltage source 2. That is, one terminal of capacitor 21 is connected to a cathode of the diode 22, and an anode of diode 22 is connected to the positive terminal of voltage source 2. In this way, when direct current voltage V2 is supplied from voltage source 2, capacitor 21 is charged up to a voltage substantially equal to direct current voltage V2, and more precisely, up to voltage V21 obtained by subtracting a forward voltage of diode 22 from direct current voltage V2. That is, when direct current voltage V2 is supplied from voltage source 2, voltage V21, which is a voltage across capacitor 21, becomes a voltage substantially equal to direct current voltage V2. When the supply of direct current voltage V2 from voltage source 2 is stopped, diode 22 turns to a reverse-bias state and is thus cut off. This prevents discharge from capacitor 21 through diode 22, and capacitor 21 holds voltage V21.

Rectifier circuit 30 is formed of a diode bridge circuit including six diodes 31 to 36. An anode of diode 31 and a cathode of diode 32 are connected to U-phase coil 3u of motor 3. An anode of diode 33 and a cathode of diode 34 are connected to V-phase coil 3v of motor 3. An anode of diode 35 and a cathode of diode 36 are connected to W-phase coil 3w of motor 3. A cathode of diode 31, a cathode of diode 33, and a cathode of diode 35 are connected to a positive output terminal of rectifier circuit 30. An anode of diode 32, an anode of diode 34, and an anode of diode 36 are connected to a negative output terminal of rectifier circuit 30. Rectifier circuit 30 rectifies induced voltage V3uv generated between the U-phase and V-phase of motor 3, induced voltage V3vw generated between the V-phase and W-phase of motor 3, and induced voltage V3wu generated between the W-phase and U-phase of motor 3, and generates rectified voltage V30. Rectifier circuit 30 outputs rectified voltage V30 to voltage divider 40.

Figure 2:
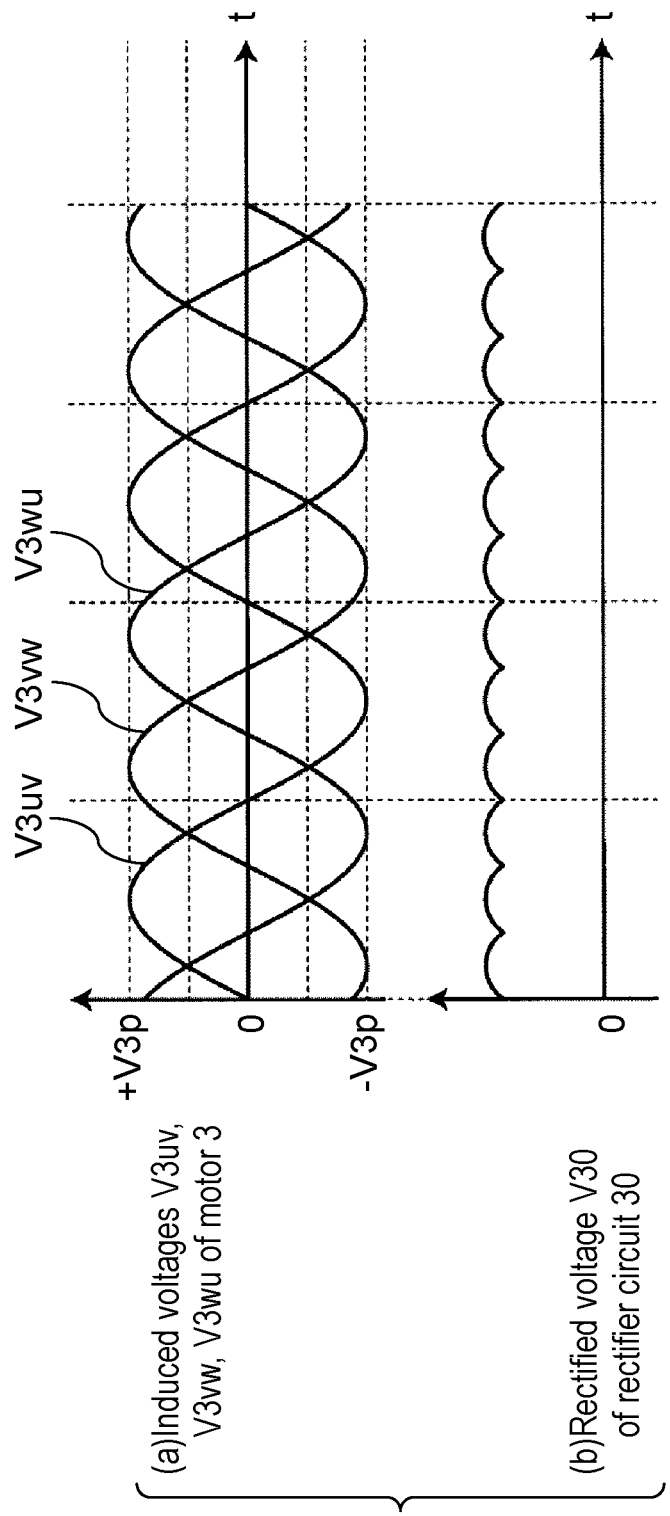
FIG. 2 is a waveform chart illustrating a relationship between waveforms of induced voltages induced between respective phases by rotating motor 3 and a waveform of rectified voltage V30 output by rectifier circuit 30.

FIG. 2 illustrates a relationship between waveforms of induced voltages induced between respective phases by rotating motor 3 and a waveform of rectified voltage V30 output by rectifier circuit 30. Part (a) of FIG. 2 is a waveform chart illustrating waveforms of induced voltages V3uv, V3vw, V3wu, which are generated between the respective phases of motor 3 in FIG. 1. Part (b) of FIG. 2 is a waveform chart illustrating a waveform of rectified voltage V30 of rectifier circuit 30 in drive control device 1 in FIG. 1. As illustrated in part (a) of FIG. 2, between the respective phases of motor 3, induced voltages V3uv, V3vw, V3wu, which are proportional to number of revolutions N3, are generated. In this exemplary embodiment, induced voltages V3uv, V3vw, V3wu are substantially sinusoidal voltages in each of which a maximum value is +V3p and a minimum value is −V3p. Rectifier circuit 30 rectifies induced voltages V3uv, V3vw, V3wu, which are generated between the respective phases of motor 3, and generates rectified voltage V30 as illustrated in FIG. 2B. In this exemplary embodiment, rectifier circuit 30 is formed of the full bridge circuit, and accordingly, rectified voltage V30 becomes a direct current voltage having a small ripple.

In FIG. 1, voltage divider 40 includes resistor 41 and resistor 42, which are connected in series to each other between the positive output terminal and negative output terminal of rectifier circuit 30. Voltage divider 40 divides rectified voltage V30, which comes from rectifier circuit 30, through resistor 41 and resistor 42, and outputs a voltage across resistor 42 as divided voltage V40 to photo coupler 50.

Photo coupler 50 includes: LED 51 that is an optically integrated light emitting element; and output transistor 52 that is a phototransistor. Note that the phototransistor is an example of an optical detector. For example, the optical detector may be a photodiode and the like. LED 51 is connected between terminals of resistor 42 of voltage divider 40, and coverts divided voltage V40 into an optical signal. A collector of output transistor 52 is connected to switch circuit 60. An emitter of output transistor 52 is connected to the negative terminal of voltage source 2. Output transistor 52 converts the optical signal, which comes from LED 51, into a converted signal. For example, when divided voltage V40 is 1.5 V or more, then a current flows through LED 51, and an optical signal is output from LED 51. Output transistor 52 that has received the optical signal turns to an ON state. In this way, output transistor 52 outputs a low-level converted signal to switch circuit 60. Meanwhile, when divided voltage V40 is less than 1.5 V, then the current hardly flows through LED 51, and no optical signal is output from LED 51. In this way, output transistor 52 turns to an OFF state, and does not output the converted signal to switch circuit 60.

Switch circuit 60 is provided between one terminal of capacitor 21 and a control terminal of short-circuit switch array 80. Switch circuit 60 includes negative-positive-negative (NPN) transistor 61, resistor 62, and resistor 63. A collector of transistor 61 is connected to one terminal of capacitor 21. An emitter of transistor 61 is connected to the control terminal of short-circuit switch array 80 via resistor 62. Resistor 63 is connected between a base and the collector of transistor 61. The base of transistor 61 is connected to the collector of output transistor 52 of photo coupler 50. The converted signal output from photo coupler 50 is input to the base of transistor 61.

Switch circuit 60 does not output a control signal when receiving the converted signal. Meanwhile, switch circuit 60 outputs the control signal when not receiving the converted signal. At this time, switch circuit 60 outputs, as the control signal, voltage V21 of capacitor 21 connected to an input side of switch circuit 60. That is, switch circuit 60 operates so as to conduct between the input side and an output side of switch circuit 60. Switch circuit 60 is an example of a second switch unit.

In accordance with these rectifier circuit 30, voltage divider 40, photo coupler 50 and switch circuit 60, motor 3 is not braked by short-circuit switch array 80 even if power supply to drive control device 1 is interrupted when number of revolutions N3 of motor 3 is equal to or higher than a number of revolutions, which is a predetermined threshold. This configuration can prevent burnout of coils 3u, 3v, 3w or damage of a circuit in drive control device 1, which is caused by overcurrents.

Here, such a threshold number of revolutions is set to such a number of revolutions such that the burnout of coils 3u, 3v, 3w or the damage of drive control device 1 cannot be caused by the overcurrents flowing when coils 3u, 3v, 3w of motor 3 are shorted to the negative terminal of voltage source 2. The threshold number of revolutions is programmable by a voltage division ratio of voltage divider 40. The voltage division ratio of voltage divider 40 is set so that divided voltage V40 becomes, for example, approximately 1.5 V when number of revolutions N3 of motor 3 is the threshold number of revolutions.

When number of revolutions N3 of motor 3 is higher than the threshold number of revolutions, divided voltage V40 becomes larger than approximately 1.5 V. In this way, the current flows through LED 51, and the converted signal is output from photo coupler 50. In this way, transistor 61 turns to the OFF state, and the input side and output side of switch circuit 60 are not connected to each other. In this way, switch circuit 60 does not output the control signal to the control terminal of short-circuit switch array 80.

Meanwhile, when number of revolutions N3 of motor 3 is less than the threshold number of revolutions, divided voltage V40 becomes smaller than approximately 1.5 V. The current hardly flows through LED 51, and accordingly, the converted signal is not output from photo coupler 50. In this way, transistor 61 turns to the ON state, and the input side and output side of switch circuit 60 are connected to each other. In this way, switch circuit 60 outputs voltage V21, which is charged to capacitor 21, as the control signal to the control terminal of short-circuit switch array 80.

Voltage detector circuit 70 includes resistor 71, resistor 72 and NPN transistor 73. Resistors 71, 72 are connected in series to each other between the positive terminal and the negative terminal of voltage source 2. A connecting node between resistor 71 and resistor 72 is connected to a base of transistor 73. A collector of transistor 73 is connected to the control terminal of short-circuit switch array 80. An emitter of transistor 73 is connected to the negative terminal of voltage source 2. In this way, transistor 73 of voltage detector circuit 70 turns to the ON state when receiving direct current voltage V2 from voltage source 2, and shorts the control terminal of short-circuit switch array 80 and the negative terminal of voltage source 2. Meanwhile, transistor 73 of voltage detector circuit 70 turns to the OFF state when not receiving direct current voltage V2 from voltage source 2, and an open state is established between the control terminal of short-circuit switch array 80 and the negative terminal of voltage source 2. As described above, voltage detector circuit 70 detects direct current voltage V2, and controls the voltage of the control terminal of short-circuit switch array 80 based on whether direct current voltage V2 is detected. Specifically, when direct current voltage V2 is detected, voltage detector circuit 70 shorts the control terminal of short-circuit switch array 80 and the negative terminal of voltage source 2 so that the voltage of the control terminal of short-circuit switch array 80 becomes the voltage of the negative terminal of voltage source 2.

When direct current voltage V2 is higher than a predetermined threshold voltage, voltage detector circuit 70 detects that the direct current voltage is being supplied. Specifically, direct current voltage V2 is divided by resistor 71 and resistor 72, and is supplied to the control terminal of transistor 73. When the voltage supplied to the control terminal of transistor 73 is larger than the threshold voltage of transistor 73, transistor 73 turns to the ON state. That is, a ratio of resistances of resistor 71 and resistor 72 is appropriately set, and thus the predetermined threshold voltage is set to an appropriate value.

As described above, voltage detector circuit 70 determines that the direct current voltage is detected when direct current voltage V2 is equal to or higher than the predetermined threshold voltage. Voltage detector circuit 70 determines that the direct current voltage is not being detected when direct current voltage V2 is less than the predetermined threshold. When voltage detector circuit 70 detects direct current voltage V2, the control signal output from switch circuit 60 flows through transistor 73 to the negative terminal of voltage source 2. In this way, the control signal does not reach the control terminal of short-circuit switch array 80, and is negated. When direct current voltage V2 is not detected in voltage detector circuit 70, the control signal output by switch circuit 60 is input to the control terminal of short-circuit switch array 80.

Short-circuit switch array 80 includes three transistors 81 to 83 such as N-channel FETs. Transistors 81 to 83 are individually provided between the output terminals of the respective phases of inverter circuit 10. Specifically, a drain of transistor 81 is connected to U-phase positive output terminal 17u of inverter circuit 10, and a source of transistor 81 is connected to the negative terminal of voltage source 2. Moreover, a drain of transistor 82 is connected to V-phase positive output terminal 17v of inverter circuit 10, and a source of transistor 82 is connected to the negative terminal of voltage source 2. Furthermore, a drain of transistor 83 is connected to W-phase positive output terminal 17*w* of inverter circuit 10, and a source of transistor 83 is connected to the negative terminal of voltage source 2. Gates (control terminals) of transistors 81 to 83 are connected to the output of switch circuit 60. Moreover, the gates of transistors 81 to 83 are connected to the collector of transistor 73 of voltage detector circuit 70. Short-circuit switch array 80 shorts the respective phase output terminals of inverter circuit 10 based on a control signal input to the gates (the control terminals) of transistors 81 to 83. Hereinafter, a voltage between the gates of transistors 81 to 83 and the negative terminal of voltage source 2 will be referred to as gate voltage V80. Short-circuit switch array 80 is an example of a first switch unit.

When direct current voltage V2 is input, and transistor 73 of voltage detector circuit 70 is in the ON state, then gate voltage V80 of transistors 81 to 83 of short-circuit switch array 80 becomes approximately 0 V. Therefore, transistors 81 to 83 turn to the OFF state, and do not short the respective phase output terminals of inverter circuit 10. Meanwhile, when the supply of direct current voltage V2 is stopped, and transistor 73 of voltage detector circuit 70 is in the OFF state, transistors 81 to 83 of short-circuit switch array 80 perform different operations in response to number of revolutions N3 of motor 3.

When number of revolutions N3 of motor 3 is equal to or higher than the above-described threshold number of revolutions, transistor 61 turns to the OFF state. At this time, the control signal is not input to the control terminal of short-circuit switch array 80, and accordingly, transistors 81 to 83 of short-circuit switch array 80 turn to the OFF state. As described above, when number of revolutions N3 of motor 3 is equal to or higher than the threshold number of revolutions, transistors 81 to 83 of short-circuit switch array 80 do not short the respective phase output terminals of inverter circuit 10. In this way, excessive currents are suppressed from flowing through coils 3*u*, 3*v*, 3*w* of motor 3.

Meanwhile, when number of revolutions N3 of motor 3 is less than the above-described threshold number of revolutions, transistor 61 turns to the ON state. At this time, the control signal output from switch circuit 60 is input to the control terminal of short-circuit switch array 80. In this way, voltage V21, which is the voltage across capacitor 21, is applied between the gates and sources of transistors 81 to 83. Therefore, transistors 81 to 83 turn to the ON state, and short the respective phase output terminals of inverter circuit 10. In this way, braking force is generated in motor 3, and motor 3 can be stopped quickly.

[1-2. Operation]

An operation of drive control device 1 for motor 3 configured as described above will be described with reference to FIG. 3. Part (a) of FIG. 3 represents a time change of direct current voltage V2 output by voltage source 2 in FIG. 1. Part (b) of FIG. 3 represents a time change of voltage V21 that is the voltage across capacitor 21 in FIG. 1. Part (c) of FIG. 3 represents a time change of number of revolutions N3 of motor 3 in FIG. 1. Part (d) of FIG. 3 represents a time change of divided voltage V40 that is the output of voltage divider 40 in FIG. 1. Part (e) of FIG. 3 represents a time change of a state of output transistor 52 of photo coupler 50 in FIG. 1. Part (f) of FIG. 3 represents a time change of a state of transistor 73 in voltage detector circuit 70 in FIG. 1. Part (g) of FIG. 3 represents a time change of a state of transistor 61 in switch circuit 60 in FIG. 1. Part (h) of FIG. 3 represents a time change of gate voltage V80 of short-circuit switch array 80 in FIG. 1.

Figure 3:
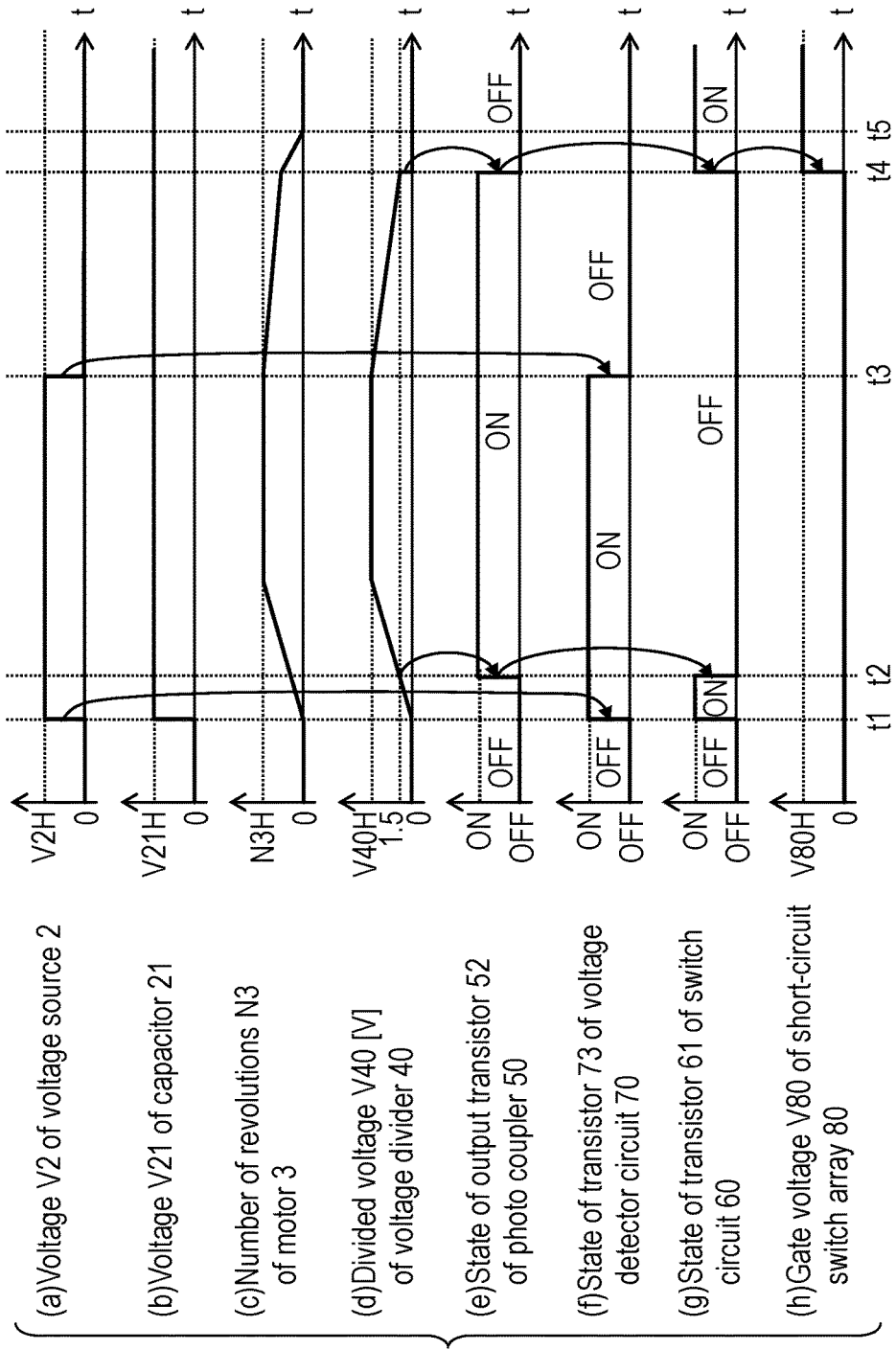
FIG. 3 is a chart showing operations of motor 3.

In an initial state in FIG. 3, motor 3 is not rotated. In a period from the initial state to time t1, voltage source 2 does not supply direct current voltage V2. In a period from time t1 to time t3, voltage source 2 supplies direct current voltage V2. In this way, motor 3 is rotated, and number of revolutions N3 reaches a predetermined number of revolutions. At time t3 and after, voltage source 2 stops the supply of direct current voltage V2. In this way, number of revolutions N3 of motor 3 is reduced. In a period from time t3 to time t4, short-circuit switch array 80 does not brake the rotation of motor 3. In a period from time t4 to time t5, short-circuit switch array 80 brakes the rotation of motor 3.

In FIG. 3, in the initial state in which voltage source 2 is in the OFF state, voltage V2 of voltage source 2 is 0 V. Voltage V21 of capacitor 21 is 0 V in the initial state. Number of revolutions N3 of motor 3 is 0 rpm. At this time, divided voltage V40 of voltage divider 40 is 0 V. Output transistor 52 of photo coupler 50 is in the OFF state. Transistor 73 is in the OFF state. Transistor 61 is in the OFF state. Moreover, gate voltage V80 of short-circuit switch array 80 is 0 V.

(1) Drive Operation of Motor (Time t1 to Time t3)

At time t1, when voltage source 2 is turned ON, direct current voltage V2 rises to voltage V2H (part (a) of FIG. 3). At this time, capacitor 21 is charged by direct current voltage V2 via diode 22. In this way, voltage V21 of capacitor 21 rises to voltage V21H (part (b) of FIG. 3).

By direct current voltage V2, transistor 73 of voltage detector circuit 70 turns to the ON state (part (f) of FIG. 3). Moreover, since output transistor 52 of photo coupler 50 is in the OFF state (part (e) of FIG. 3), the voltage of the control terminal of transistor 61 of switch circuit 60 is pulled up to voltage V21 of capacitor 21 by resistor 63. In this way, transistor 61 of switch circuit 60 turns to the ON state (part (g) of FIG. 3). When transistor 73 of voltage detector circuit 70 is in the ON state, gate voltage V80 of transistors 81 to 83 of short-circuit switch array 80 is 0 V (part (h) of FIG. 3). That is, from time t1 to time t3, transistors 81 to 83 are in the OFF state. In this way, the respective phase output terminals of inverter circuit 10 are not shorted, and the three-phase alternating current voltage generated by inverter circuit 10 is individually supplied to U-phase coil 3*u*, V-phase coil 3*v* and W-phase coil 3*w* of motor 3.

Inverter circuit 10 drives motor 3, and thus number of revolutions N3 of motor 3 gradually increases (part (c) of FIG. 3). At this time, voltages V3*uv*, V3*vw*, V3*wu* between the phases of motor 3 gradually increase. As a result, rectified voltage V30, which is obtained by rectifying these inter-phase voltages, and divided voltage V40 gradually increase (part (d) of FIG. 3).

Thereafter, when divided voltage V40 of voltage divider 40 reaches 1.5 V at time t2 (part (d) of FIG. 3), output transistor 52 of photo coupler 50 turns to the ON state (part (e) of FIG. 3). In this way, transistor 61 of switch circuit 60 turns to the OFF state (part (g) of FIG. 3). Voltage V2H is supplied as direct current voltage V2, and accordingly, transistor 73 of voltage detector circuit 70 remains in the ON state. Due to these facts, transistors 81 to 83 of short-circuit switch array 80 remain in the OFF state. The three-phase alternating current voltage from inverter circuit 10 continues to be supplied to motor 3. Thereafter, number of revolutions N3 of motor 3 rises to number of revolutions N3H (part (c) of FIG. 3), and number of revolutions N3H concerned is held. At this time divided voltage V40 rises to voltage V40H (part (d) of FIG. 3).

(2) Stop Operation for Motor (at High Rotation, No Braking) (Time t3 to Time t4)

Next, at time t3 when motor 3 is in an operating state, voltage source 2 is turned OFF. Direct current voltage V2 of voltage source 2 drops to 0 V (part 3(a) of FIG. 3). At this time, diode 22 turns to the reverse-bias state, and accordingly, voltage V21 of capacitor 21 is held (part (b) of FIG. 3). Note that actually voltage V21 gradually decreases, but a description will be given here on the assumption that voltage V21 is constant at voltage V2111.

When voltage V2 drops to 0 V, transistor 73 of voltage detector circuit 70 turns to the OFF state (part (f) of FIG. 3). Moreover, since output transistor 52 of photo coupler 50 is in the ON state (part (e) of FIG. 3), transistor 61 of switch circuit 60 remains in the OFF state (part (g) of FIG. 3). As described above, even if direct current voltage V2 drops to 0 V, when number of revolutions N3 of motor 3 is equal to or higher than the above-described threshold number of revolutions, output transistor 52 of photo coupler 50 is in the ON state, and transistor 61 of switch circuit 60 turns to the OFF state. That is, switch circuit 60 does not output the control signal. Since the control signal is not supplied to the gates of transistors 81 to 83, gate voltage V80 of transistors 81 to 83 remains at 0 V (part (h) of FIG. 3). In this way, transistors 81 to 83 continue to be in the OFF state. In this way, the respective phase output terminals of inverter circuit 10 are not shorted with one another.

As described above, even if direct current voltage V2 drops to 0 V, when number of revolutions N3 of motor 3 is equal to or higher than the above-described threshold number of revolutions, drive control device 1 does not short the respective phase output terminals of inverter circuit 10 with one another. In this way, such excessive currents can be suppressed from flowing through coils 3u, 3v, 3w of motor 3.

At this time, since respective transistors 11 to 16 of inverter circuit 10 turn to the OFF state, number of revolutions N3 of motor 3 gradually decreases while motor 3 continues to rotate due to inertial force (part (c) of FIG. 3). As a result, induced voltages V3uv, V3vw, V3wu between the respective phases of motor 3 gradually drop, and rectified voltage V30, which is obtained by rectifying these induced voltages V3uv, V3vw, V3wu, and divided voltage V40 gradually drop (part (d) of FIG. 3).

(3) Stop Operation for Motor (at Low Rotation, with Braking) (Time t4 to Time t5)

Next, at time t4, number of revolutions N3 of motor 3 becomes less than the above-described threshold number of revolutions, and divided voltage V40 of voltage divider 40 drops to less than 1.5 V (part (d) of FIG. 3). In this way, output transistor 52 of photo coupler 50 turns to the OFF state (part (e) of FIG. 3), and transistor 61 of switch circuit 60 turns to the ON state (part (g) of FIG. 3). In this way, the control signal is input to the gates of transistors 81 to 83 of short-circuit switch array 80, and gate voltage V80 becomes voltage V80H (part (h) of FIG. 3). In this way, transistors 81 to 83 turn to the ON state, and the respective phase output terminals of inverter circuit 10 are shorted with one another. As a result, coils 3u, 3v, 3w of motor 3 are shorted with one another, the braking force is generated in motor 3, and motor 3 can be stopped quickly (time t5 in part (c) of FIG. 3). Note that, since coils 3u, 3v, 3w of motor 3 are shorted to the negative terminal of voltage source 2 at time t4, divided voltage V40 becomes 0 V (time t4 in part (d) of FIG. 3).

[1-3. Effects]

As described above, in this exemplary embodiment, drive control device 1 for motor 3 is a drive control device that controls the drive of motor 3. The drive control device includes an input terminal, an output terminal, inverter circuit 10, short-circuit switch array 80, capacitor 21, diode 22, rectifier circuit 30, photo coupler 50, switch circuit 60, and voltage detector circuit 70. The input terminal is a terminal that receives a direct current voltage. The output terminal is a terminal that outputs an alternating current voltage to motor 3. Inverter circuit 10 converts direct current voltage V2 into an alternating current voltage, and outputs the alternating current voltage to the output terminal. Short-circuit switch array 80 shorts output terminals of inverter circuit 10 based on a control signal. Capacitor 21 is connected to the input terminal, and is charged by direct current voltage V2. Diode 22 is connected between the input terminal and capacitor 21. Diode 22 limits a direction where a charge current for charging capacitor 21 flows. Rectifier circuit 30 rectifies induced voltages, which are generated in motor 3, and outputs rectified voltage V30. Photo coupler 50 converts rectified voltage V30 into an optical signal, and thereafter, converts the optical signal into a converted signal. Switch circuit 60 includes an input terminal connected to capacitor 21; and an output terminal that outputs a control signal. Switch circuit 60 outputs the control signal based on the converted signal. Voltage detector circuit 70 detects whether to detect direct current voltage V2, and determines whether to negate the control signal. When not receiving the converted signal, switch circuit 60 outputs a voltage of the input terminal of switch circuit 60 as the control signal to the output terminal of switch circuit 60. When receiving the converted signal, switch circuit 60 outputs the control signal to the output terminal of switch circuit 60. When detecting that direct current voltage V2 is input to the input terminal, voltage detector circuit 70 negates the control signal.

In this exemplary embodiment, when direct current voltage V2 is supplied (t1 to t3 in FIG. 3), voltage detector circuit 70 does not output a control signal, which comes from switch circuit 60, to short-circuit switch array 80. In this way, short-circuit switch array 80 does not short the output terminals of inverter circuit 10 when direct current voltage V2 is supplied, and no braking force is generated in motor 3. Moreover, for example, even when the rotation of motor 3 is suddenly stopped due to an external factor, short-circuit switch array 80 shorts voltages output by inverter circuit 10, and such a situation that a large through current flows can be prevented.

Meanwhile, when the supply of direct current voltage V2 is stopped (t3 to t5 in FIG. 3), voltage detector circuit 70 outputs the control signal, which comes from switch circuit 60, to short-circuit switch array 80.

At this time, when number of revolutions N3 of motor 3 is equal to or higher than the above-described threshold number of revolutions (t3 to t4 in FIG. 3), output transistor 52 of photo coupler 50 turns to the ON state, and photo coupler 50 outputs the converted signal. At this time, switch circuit 60 does not output voltage V2 of capacitor 21 as the above-described control signal. In this way, short-circuit switch array 80 does not short the output terminals of inverter circuit 10, and accordingly, no braking force is generated in motor 3. Therefore, the excessive currents can be suppressed from flowing through coils 3u, 3v, 3w of motor 3.

When number of revolutions N3 of motor 3 is less than the above-described threshold number of revolutions (t4 to t5 in FIG. 3), output transistor 52 of photo coupler 50 turns to the OFF state, and photo coupler 50 does not output a converted signal. In this way, switch circuit 60 outputs voltage V21 of capacitor 21 as the above-described control signal. In this way, the control signal is supplied to short-circuit switch array 80, and short-circuit switch array 80 shorts coils 3u, 3v, 3w of motor 3 with one another. The braking force is generated in motor 3. Therefore, motor 3 can be stopped quickly.

As described above, in accordance with this exemplary embodiment, the voltages between coils 3u, 3v, 3w of motor 3, that is number of revolutions of motor 3 is detected, and thus the braking of motor 3 is controlled. Specifically, drive control device 1 does not brake motor 3 when the number of revolutions of motor 3 is equal to or higher than the above-described threshold number of revolutions, and brakes motor 3 only when the number of revolutions of motor 3 decreases to less than the above-described threshold number of revolutions. Motor 3 can be stopped quickly by suppressing the overcurrents generated in coils 3u, 3v, 3w of the motor 3.

Moreover, in this exemplary embodiment, capacitor 21 is charged via diode 22 when direct current voltage V2 is supplied. When the supply of direct current voltage V2 is stopped, diode 22 turns to the reverse-bias state, and accordingly, capacitor 21 holds voltage V21. Voltage V21 of capacitor 21 is used in order to operate short-circuit switch array 80, and thus the above-described braking of motor 3 can be performed even when the supply of direct current voltage V2 is stopped.

Furthermore, according to this exemplary embodiment, the above-described braking of motor 3 can be achieved by a simple circuit.

Accordance to this exemplary embodiment, both of the output of switch circuit 60, which operates in response to the number of revolutions of motor 3, and the output of voltage detector circuit 70, which operates in response to whether direct current voltage V2 is supplied, are connected to the control terminal of short-circuit switch array 80. In this way, short-circuit switch array 80 can be controlled by a simpler circuit.

Moreover, switch circuit 60 is configured so that an output impedance of switch circuit 60 is higher than an output impedance of voltage detector circuit 70 when switch circuit 60 outputs the control signal, and when voltage detector circuit 70 shorts the control terminal of short-circuit switch array 80 and the negative terminal of voltage source 2. Specifically, switch circuit 60 includes resistor 62 between the emitter of transistor 61 and the control terminal of short-circuit switch array 80. In this way, in an operation state corresponding to a period from time t2 to time t3 in FIG. 3, voltage detector circuit 70 can negate the control signal more surely. In this way, short-circuit switch array 80 can be prevented more surely from shorting coils, 3u, 3v, 3w of motor 3 at abnormal timing.

Drive control device 1 of this exemplary embodiment includes photo coupler 50 between the output of voltage divider 40 and the switch circuit 60. In this way, coils 3u, 3v, 3w of motor 3, which have large voltage amplitude, and switch circuit 60 can be electrically isolated from each other. In this way, the braking of motor 3 can be achieved by a simpler circuit. Moreover, switch circuit 60 can be operated more surely.

Other Exemplary Embodiments

As above, the first exemplary embodiment has been described as illustration of the technique disclosed in the present application. However, the technique in the present disclosure is not limited to the above-described first exemplary embodiment, but is applicable to another exemplary embodiment where an amendment, a replacement, an addition, or an omission has been made appropriately. Accordingly, another exemplary embodiment will be illustrated below.

For example, in the first exemplary embodiment, the NPN transistor has been illustrated as transistor 73 of voltage detector circuit 70, however, transistor 73 may be an N-channel FET.

Moreover, in this first exemplary embodiment, the N-channel FETs has been illustrated as transistors 11 to 16 of inverter circuit 10, however, transistors 11 to 16 may be P-channel FETs, or may be NPN transistors or PNP transistors.

The exemplary embodiments have been described above as the illustration of the technique in the present disclosure. The accompanying drawings and the detailed description have been provided for this purpose.

Hence, the constituents described in the accompanying drawings and the detailed description may include not only essential constituents for solving the problem but also constituents inessential for solving the problem in order to illustrate the above-described technique. Therefore, it should not immediately be construed that these inessential constituents are essential based on the fact that the inessential constituents are described in the accompanying drawings and the detailed description.

Since the above-described exemplary embodiments are those for illustrating the technique in the present disclosure, various modifications, replacements, additions and omissions can be made within the scope of the appended claims or of their equivalents.

The present disclosure can be used for an instrument that uses a motor driven by using an inverter, and for example, is applicable to a projector, a washing machine and the like.

What is claimed is:

1. A drive control device for a motor, the drive control device serving to control drive of the motor, the drive control device comprising:
   an input terminal that receives a direct current voltage;
   an output terminal that outputs an alternating current voltage to the motor;
   an inverter circuit that converts the direct current voltage into the alternating current voltage, and outputs the alternating current voltage to the output terminal;
   a first switch unit that shorts the output terminal based on a control signal;
   a capacitor that is connected to the input terminal, and is charged with the direct current voltage;
   a diode that is connected between the input terminal and the capacitor, and limits a direction where a charge current for charging the capacitor flows;
   a rectifier circuit that rectifies an induced voltage generated in the motor, and outputs a rectified voltage;
   a photo coupler that converts the rectified voltage into an optical signal, and thereafter, converts the optical signal into a converted signal;
   a second switch unit that outputs the control signal based on the converted signal, the second switch unit including a second switch unit input terminal connected to the capacitor and a second switch unit output terminal that outputs the control signal; and
   a voltage detector that detects whether the direct current voltage is input to the input terminal, and determines whether to negate the control signal, wherein the second switch unit outputs a voltage of the second switch unit input terminal as the control signal to the second switch unit output terminal when not receiving the converted signal, and does not output the control signal to the second switch unit output terminal when receiving the converted signal, and the voltage detector negates the control signal when detecting that the direct current voltage is input to the input terminal.

2. The drive control device for a motor according to claim 1, further comprising a plurality of the output terminals in which phases of the alternating current voltage are different from one another, wherein the first switch unit includes a first transistor having a control terminal that receives the control signal, and the first switch unit is connected between the plurality of the output terminals.

3. The drive control device for a motor according to claim 2, wherein the direct current voltage is supplied from a voltage source, the voltage detector includes a first resistor and a second resistor, which are connected in series between a positive terminal and a negative terminal of the voltage source in this order; and a second transistor connected between the control terminal of the first switch unit and the negative terminal of the voltage source, and the second transistor includes a control terminal connected to a connecting node between the first resistor and the second resistor.

4. The drive control device for a motor according to claim 2, wherein the second switch unit includes a third transistor connected between the second switch unit input terminal and the second switch unit output terminal; and a third resistor connected between the second switch unit input terminal and a control terminal of the third transistor, the second switch unit input terminal is connected to a connecting node between the capacitor and the diode, the second switch unit output terminal is connected to the control terminal of the first switch unit, the control terminal of the third transistor is connected to an output of the photo coupler, and the third transistor is turned ON or OFF based on the converted signal.

5. The drive control device for a motor according to claim 1, further comprising a voltage divider that divides the rectified voltage coming from the rectifier circuit and outputs a divided voltage to the photo coupler.

6. The drive control device for a motor according to claim 1, wherein the second switch unit outputs the control signal by setting a state between the second switch unit input terminal and the second switch unit output terminal into a conductive state when the converted signal is in an OFF state, and sets the state between the second switch unit input terminal and the second switch unit output terminal into a cut-off state when the converted signal is in an ON state.

7. The drive control device for a motor according to claim 1, wherein the voltage detector includes a voltage detector output terminal connected to the second switch unit output terminal, and the second switch unit is configured such that an output impedance of the second switch unit is higher than an output impedance of the voltage detector when the converted signal is in an ON state and input of the direct current voltage to the input terminal is detected.

* * * * *